Oct. 11, 1927.  1,645,507
J. M. MOYER ET AL
CULTIVATOR
Filed Jan. 25, 1927   2 Sheets-Sheet 2
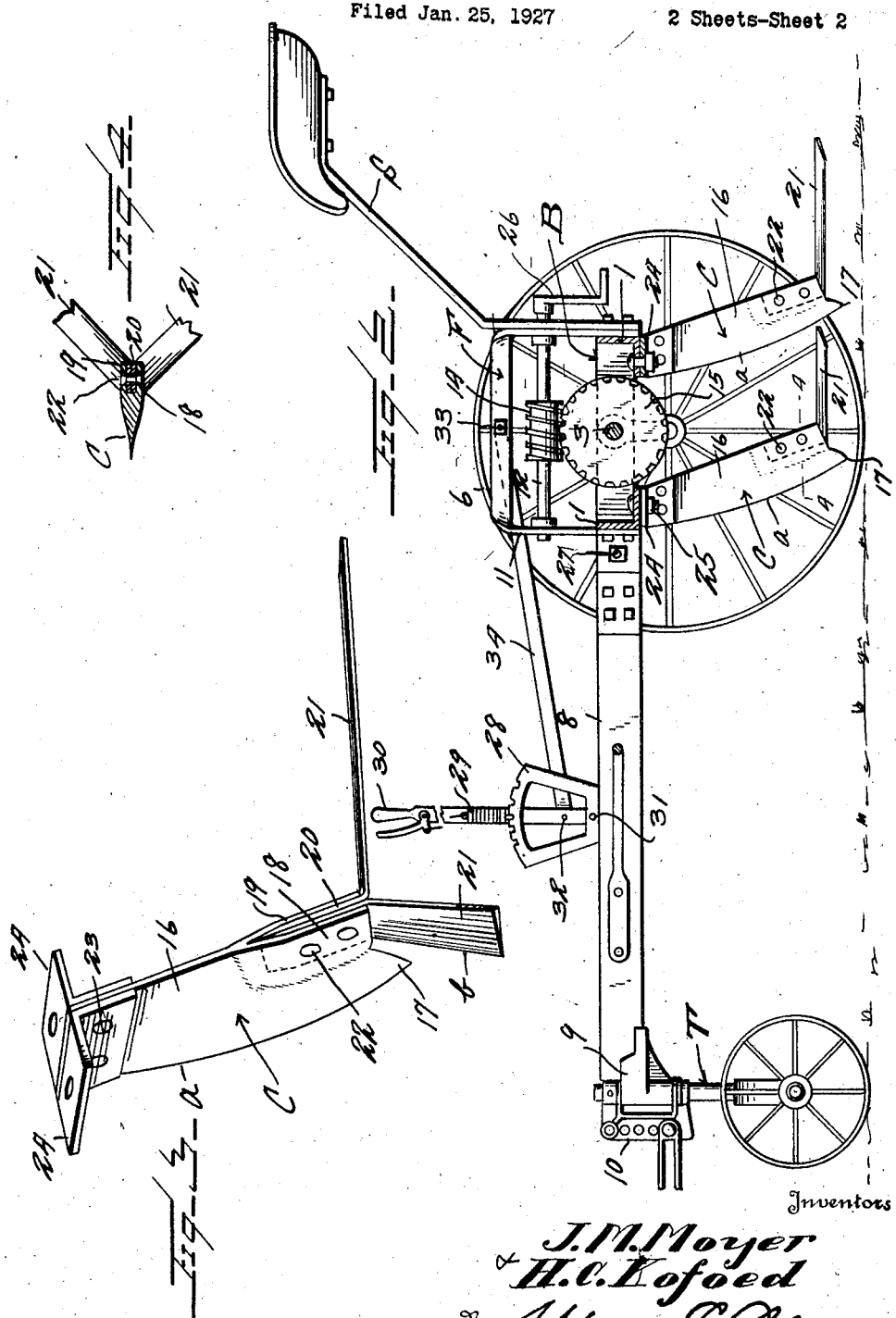
Inventors
J. M. Moyer
H. C. Lofoed
By Watson E. Coleman
Attorney Patented Oct. 11, 1927.

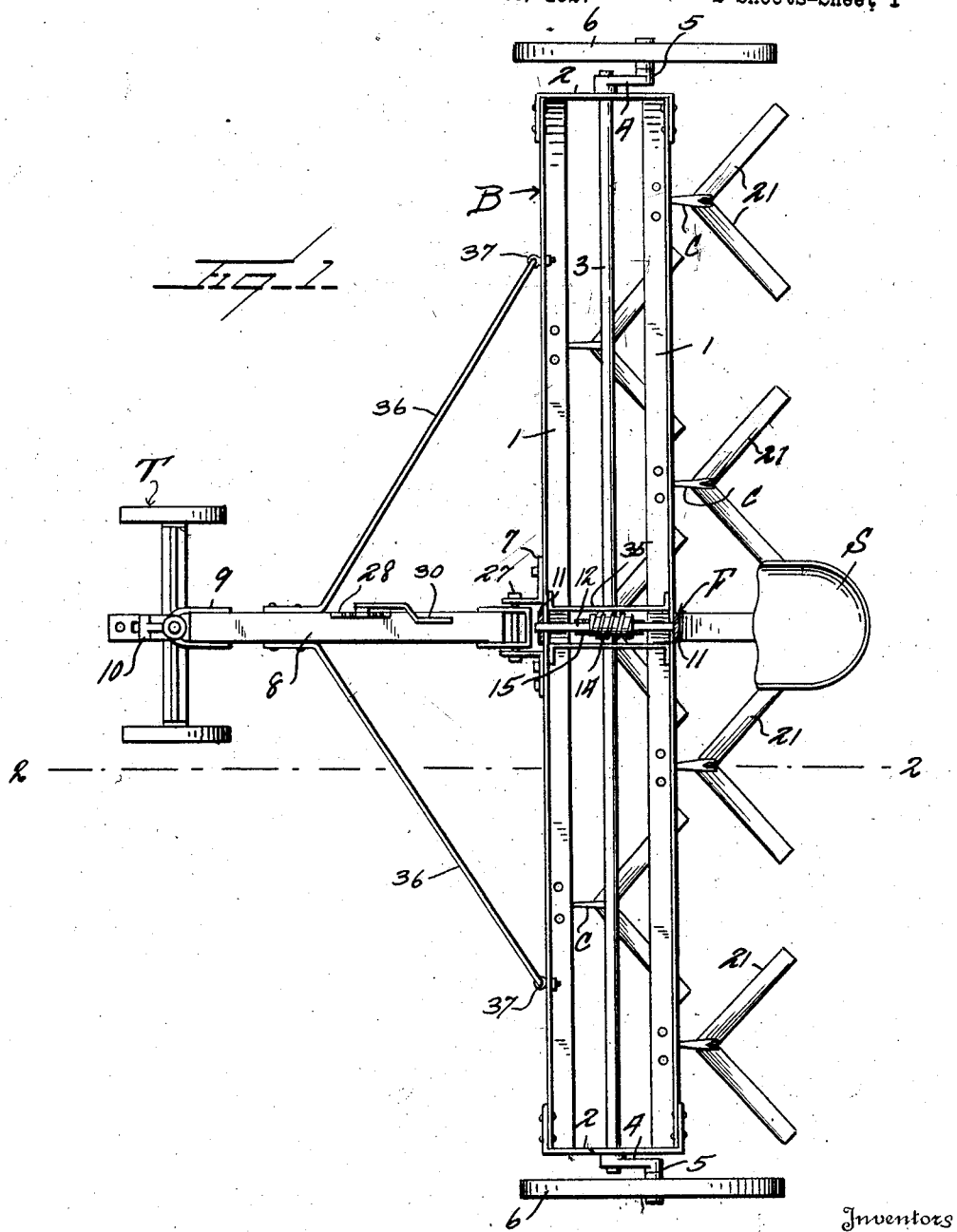

1,645,507

UNITED STATES PATENT OFFICE.

JAMES M. MOYER AND HANS C. KOFOED, OF YUMA, COLORADO.

CULTIVATOR.

Application filed January 25, 1927. Serial No. 163,450.

This invention relates to cultivators and it is an object of the invention to provide a device of this kind light in draft and which can be employed effectually for the purpose of destroying weeds or other foreign growth in summer fallowed or fall plowed land.

Another object of the invention is to provide a device of this kind including ground working elements which, in addition to destroying weeds or the like, create a soil mulch of considerable depth to receive and hold moisture so beneficial to the growth of winter wheat and other crops.

An additional object of the invention is to provide a device of this kind including a cutting element or member operating in a manner to cut or slice weeds or kindred growth at a point below the surface of the soil and wherein the cutting element or member is so constructed and assembled to eradicate all of such growth and leave the surface of the soil or ground smooth suitable for seeding.

A still further object of the invention is to provide a device of this kind embodying a cutting element or member together with means for readily raising or lowering the same as the occasions of practice may require.

The invention consists in the details of construction and in the combination and arrangement of the several parts of our improved cultivator whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a view in top plan of a cultivator constructed in accordance with an embodiment of our invention;

Figure 2 is a sectional view taken substantially on the line 2—2 of Figure 1;

Figure 3 is a view in perspective of one of the cutting elements or members unapplied;

Figure 4 is a horizontal sectional view taken through the upper portion of the vertical or main blade of the cutting element as herein set forth, the associated cultivator blades being shown in fragment.

As disclosed in the accompanying drawings, our improved cultivator comprises a body B constituting a rectangular frame including the front and rear angle members 1 connected at their extremities by the end members 2.

Disposed lengthwise of the body B at a point substantially midway of the members 1 is an axle 3 rotatably supported by the end members 2. The extremities of the axle 3 have fixed thereto the laterally disposed parallel arms 4 terminating in outstanding spindles 5 upon which are mounted the supporting wheels 6 preferably relatively large in diameter.

The front member 1 at substantially its center has secured thereto by the brackets 7 or otherwise as may be preferred a forwardly directed tongue 8 of desired length the outer extremity of which being operatively engaged, as at 9, with a forward steering truck T. This truck T may be of any type preferred and has associated therewith a clevis 10 whereby the device may be hitched to a tractor or, if desired, may have suitable draft rigging coupled thereto so that draft animals may be employed.

The central portion of the rear member 1 supports a seat structure S of any desired type.

The central portions of the members 1 have suitably affixed thereto an upstanding frame F herein disclosed as coplaner with the tongue 8 and the seat structure S. This frame F includes the vertically disposed members 11 which rotatably support a shaft 12. This shaft 12 has fixed thereto a worm 14 constantly meshing with a gear wheel 15 fixed to the axle 3. Upon rotation of the shaft 12 the axle 3 will be rotated to turn the same in either direction resulting in either raising or lowering the body B with respect to the axes of the wheels 6.

Carried by the members 1 of the body B at points spaced therealong are the cutting members or elements C with the elements or members carried by one of the members 1 in staggered relation with respect to the cutting elements or members carried by the second member 1 of the body B. Each of these cutting elements or members C comprises a vertically disposed and relatively broad blade 16 having its cutting edge $a$ forwardly disposed and arranged on a predetermined downward and inward curvature. The lower forward portion of the blade is continued by a depending point 17 resulting in the provision of what might be termed a lower rear heel portion 18. This heel portion 18 has its forward part merging with the adjacent portion of the blade 16 but has its major portion bifurcated, as at 19, such bifurcation being open along the lower and rear edge faces of the heel portion 18. Extending and substantially snugly received within the kerf of this bifurcation 18 are the overlying upstanding arms 20 carried by the inner end portions of the cultivator blades 21. Disposed through the heel portion 18 and the arms 20 are the rivets 22 or other fastening elements whereby the cultivator blades 21 are effectively maintained in applied position with respect to the blades 16.

This particular assembly of the blades 16 and 21 results in a structure whereby no hinderance or obstruction is offered upon which weeds or other foreign matter will have a tendency to collect.

The cultivator blades 21 are each of material length with its cutting edge $b$ forwardly disposed. Each of these blades is also disposed in substantially a horizontal direction when the cutting element or member C is in applied or working position.

The upper portion of the blade 16 has riveted, as at 23, or otherwise fixedly secured thereto the oppositely directed bracket plates 24. These plates 24 are adapted to have close contact from below with one of the members 1 of the body B and each of said plates is bolted, as at 25, or otherwise suitably secured to the associated member 1.

As is particularly illustrated in Figure 1 of the accompanying drawings, it is to be noted that the assembly of the cutting elements or members C is such that the adjacent cultivator blades 21 of the adjoining elements or members C travel in overlapping pairs. By this arrangement or assembly a continuous treatment or action is had upon the soil for a distance extending from substantially one end of the body B to the other.

In practice, the cultivator blades work below the top of the soil and the working depth of such blades may be readily regulated as desired upon requisite turning movement of the shaft 12. This shaft 12 may be operated in any desired manner but, as herein disclosed, an end portion of such shaft 12 has fixed thereto an operating crank 26. It will, therefore, be understood that weeds and kindred foreign growth are cut below the top of the ground or soil and thus effectively destroyed and at the same time as the device travels or advances the ground or soil is formed into a mulch of material depth with the top of such soil smooth for seeding.

The production of this mulch is of advantage as it will receive and hold the moisture which is so beneficial to the growth of winter wheat and other crops.

It will also be understood that the desired penetration of the blades 21 below the surface of the ground or soil may be materially facilitated by the point 17 and also the advance of each of the elements or members C will be facilitated not only by such point 17 but by the blade 16.

The tongue 8 is pivotally engaged, as at 27, with the body B whereby said tongue and body B may have relative swinging movement in a vertical direction. The tongue 8 at a desired point intermediate its ends is provided with an upstanding rack 28 with which coacts the latch mechanism 29 carried by a lever 30. This lever 30, as herein disclosed, is pivotally connected, as at 31, with the lower portion of the rack 28 although this may be varied if desired. Pivotally connected, as at 32, with the lever 30 and with the upper central portion of the frame F, as at 33, is a rigid member or bar 34. By the proper manipulation of the lever 30 to effect a tilting adjustment of the body B the position of the cutting devices C will be varied as the occasions may prefer.

The members 1 of the body B at opposite sides of the shaft 12 and in close proximity thereto are connected by the cross members 35 which provide supports for the axle 3.

The outer end portion of the tongue 8 has secured thereto the reinforcing or bracing rods 36 which are also operatively engaged, as at 37, with the forward member 1 of the body B at points adjacent the outer extremities thereof.

From the foregoing description it is thought to be obvious that a cultivator constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. A device of the class described comprising, in combination, a frame, ground engaging means for supporting the frame, a cutting element depending from the frame, said cutting element comprising a vertically disposed blade having a forwardly directed cutting edge, the lower rear portion of said blade being provided with a kerf, laterally directed and substantially horizontally disposed cutting blades having arms extending within the kerf of the first named blade, and means for securing said arms to the first named blade.

2. A device of the class described comprising, in combination, a frame, ground engaging means for supporting the frame, a cutting element depending from the frame, said cutting element comprising a vertically disposed blade having a forwardly directed cutting edge, the lower rear portion of said blade being provided with a kerf, laterally directed and substantially horizontally disposed cutting blades having arms extending within the kerf of the first named blade, and means for securing said arms to the first named blade, the forward lower portion of the first named blade being provided with a depending tooth.

In testimony whereof we hereunto affix our signatures.

JAMES M. MOYER.
HANS C. KOFOED.